United States Patent [19]

Carlson

[11] Patent Number: 4,816,729
[45] Date of Patent: Mar. 28, 1989

[54] CLOSED LOOP MACHINING SYSTEM CALIBRATION

[75] Inventor: John C. Carlson, Danvers, Mass.

[73] Assignee: General Electric Company, Cincinnati, Ohio

[21] Appl. No.: 880,609

[22] Filed: Jun. 30, 1986

[51] Int. Cl.$^4$ ............................................. G05B 19/42
[52] U.S. Cl. ............................... 318/568; 364/571.01; 73/1 B; 318/646
[58] Field of Search ............... 318/568, 640, 191, 646; 901/9, 10, 30–35, 46–49; 364/571, 513; 29/568; 73/1 B

[56] References Cited

U.S. PATENT DOCUMENTS

| | | | |
|---|---|---|---|
| 3,888,362 | 6/1975 | Fletcher et al. | 318/640 |
| 4,305,130 | 12/1981 | Kelley et al. | 318/640 |
| 4,382,215 | 5/1983 | Barlow et al. | 318/568 |
| 4,706,372 | 11/1987 | Ferrero et al. | 29/568 |

Primary Examiner—Bernard Roskoski
Assistant Examiner—David S. Martin
Attorney, Agent, or Firm—James M. Stover; Derek P. Lawrence

[57] ABSTRACT

This application deals with apparatus for calibrating an automated machining apparatus. The calibration apparatus comprises a tool probe and a system accuracy check gauge rigidly fixed to the workpiece loading mechanism of the machining apparatus. This arrangement allows variations in the locations of the cutting edges of the tools used in the machining apparatus to be taken into account in the machining operation and also allows checking of the dimensional and positional accuracy of the machining apparatus against a precisely known reference.

11 Claims, 2 Drawing Sheets

CLOSED LOOP MACHINING SYSTEM CALIBRATION

FIELD OF THE INVENTION

This invention relates to the field of closed loop machining. More specifically, this invention relates to systems for automatically improving the accuracy of closed loop machining systems.

BACKGROUND OF THE INVENTION

It is common today to manufacture parts with closed loop numerically controlled machining systems. Those machining systems automatically control the positioning and operation of a machine tool with respect to a workpiece to machine the workpiece to precise tolerance in accordance with a predetermined computer program.

In addition to automatically controlling the actual machining operation, it has been proposed to automatically calibrate the components of the machining system to improve and maintain machining system accuracy and workpiece tolerances. Such calibration ideally should be accomplished on the machining system without human intervention as one step in achieving a completely automated production facility.

Barlow et al. U.S. Pat. No. 4,382,215 ("the Barlow patent") describes a system to automatically machining a workpiece to precise dimensions under computer numerical control. The machining system includes a movable probe mounted in a turret containing a plurality of tools. The turret can be rotated to bring selected tools into position for machining a workpiece mounted in a chuck fixed to a rotating spindle. The movable probe first is calibrated against position reference surfaces on the chuck. The calibrated movable probe then is used to calibrate a fixed tool probe mounted to a stationary support for the machining apparatus at a location remote from the area where workpieces are to be machined. The calibrated fixed probe next is used to calibrate the cutting edges of the tools in the turret. These calibration procedures are carried out under closed loop control. Tool position offsets are automatically determined in light of these calibration procedures. Those offsets are used to modify the machining operation programmed into the computer numerical control to improve machining accuracy.

Although the machining apparatus of the Barlow patent is a significant advance in achieving a totally automated machining apparatus and operates well for its described purposes, Applicant has been able to develop a significant improvement on such apparatus. Applicant has unexpectedly discovered several problems regarding the location and mounting of the fixed tool probe in machining apparatus similar to that of the Barlow patent.

In most automated machining apparatus, there is not enough room to mount the tool probe in the location suggested by the Barlow patent because this location is occupied by auxiliary equipment such as a mechanism for collecting the scrap material machined from the workpiece.

The simplest arrangement from a computer programming standpoint is to have the two probe axes oriented parallel to one of the x- or z-axes of the machine during a calibration operation, as shown in the Barlow patent. However, in many machining apparatus, the axis of rotation of the turret is at an angle with respect to both the x- and z-axes of the machine. Accordingly, the movable probe in such a turret is oriented at an angle with respect to both the x- and z-axes of the machine when the turret is indexed to bring the movable probe into position for contacting the fixed tool probe. The point at which the movable probe emits an output signal when it contacts the fixed probe is a function of the angle of the movable probe with respect to the x- and z-axes. If this angle is not taken into account, an error in the machine calibration can result. This angle can be taken into account in the computer program to eliminate such error, but this introduces additional programming complexity which could compromise speed, reliability, and accuracy. Thus, it is difficult to use the Barlow arrangement of probes in a machining apparatus having a turret axis that is not parallel to the x- or z-axes of that machining apparatus.

Another problem with the location of the fixed probe in the Barlow patent is that machining and workpiece measuring take place at one end of the machine and tool calibration takes place at the other end of the machine, a substantial distance away from the machining and measuring operations. Movement of the turret over this distance adds additional unwanted inaccuracy due to cummulative positioning errors, such as those caused by backlash in the mechanical connections between the drive motors and the turret and in the mechanical connections between the drive motors and the position sensors.

Accordingly, there is a need for a tool probe in the vicinity of the machining environment. This causes an additional problem because the machining environment is a hostile one. Cooling and lubricating fluid is sprayed onto the moving parts and much heat debris are generated during machining thus limiting the accuracy, reliability, and useful life of any tool probe in such an environment.

One approach which was tried to overcome these problems was a separate mechanism which supported the tool probe at one end of a swing arm. The swing arm was constructed such that it was able to move the probe into the machining area when it was desired to perform a calibration operation with the tool probe. At all other times, the swing arm positioned the tool probe outside the machining environment until needed for a calibration operation. It was found that such an arrangement was not rigid enough to provide accurate calibration. The cost of strengthening the swing arm to provide adequate rigidity was too prohibitive. The additional swing arm also resulted in a more complicated mechanical arrangement which took up too much space and resulted in additional complexity in the computer program.

Another approach was to remove the workpiece from the machine tool and replace it on the spindle with a tool probe when it was desired to perform a calibration operation with the tool probe. This was also unsatisfactory because either a machine tool operator had to manually fix the tool probe to the spindle or some form of swing arm had to be devised to do the same. Manually manipulating the tool probe of course prevented the achievement of a completely automated machining operation and the swing arm would introduce the mechanical and electrical complexity described above. In addition, removal of the workpiece during a machining operation introduced further error.

An additional technique of solving the problems associated with locating a tool probe in an automated machining apparatus was tried. The tool probe was mounted on the tool changing mechanism. This tool changing mechanism comprises a swing arm with a pair of jaws at one end for grasping a tool. The swing arm is able to remove tools from a drum containing a number of tools and place those tools into the turret of the machining apparatus. The swing arm also removes tools from the turret and replaces them in the drum. The rigidity of this arrangement also proved to be inadequate, especially for machining jet engine parts, some which require dimensional tolerances as low as 0.001 inches.

Accordingly, a novel mounting of a calibration means has been devised which avoids the problems associated with prior arrangements.

SUMMARY OF THE INVENTION

It is an object of the invention to provide a novel completely automated calibration means for a machining apparatus.

It is a further object of the invention to provide a novel calibration means which is located in the vicinity of the machining environment only during calibration.

It is an additional object of the invention to provide a calibration means having a mounting which is sufficiently rigid for precision calibration.

It is also an object of the invention to provide a calibration means which adds little or no mechanical or electrical complexity to existing automated computer numerically controlled machining apparatus.

In accordance with these objects, the invention of this application relates in part to a means for calibrating a machining apparatus fixed to a means for loading a workpiece into the machining apparatus. In one embodiment, the means for calibrating produces an electrical signal when it is contacted by the cutting edge of a tool used in the machining apparatus. This signal is used to set the tool offset compensation in a computer numerical controller which regulates the operation of the machining apparatus.

BRIEF DESCRIPTION OF THE DRAWINGS

FIG. 3a is a sectional view taken along line 3a—3a in FIG. 2a.

DETAILED DESCRIPTION OF THE INVENTION

Figure 1:
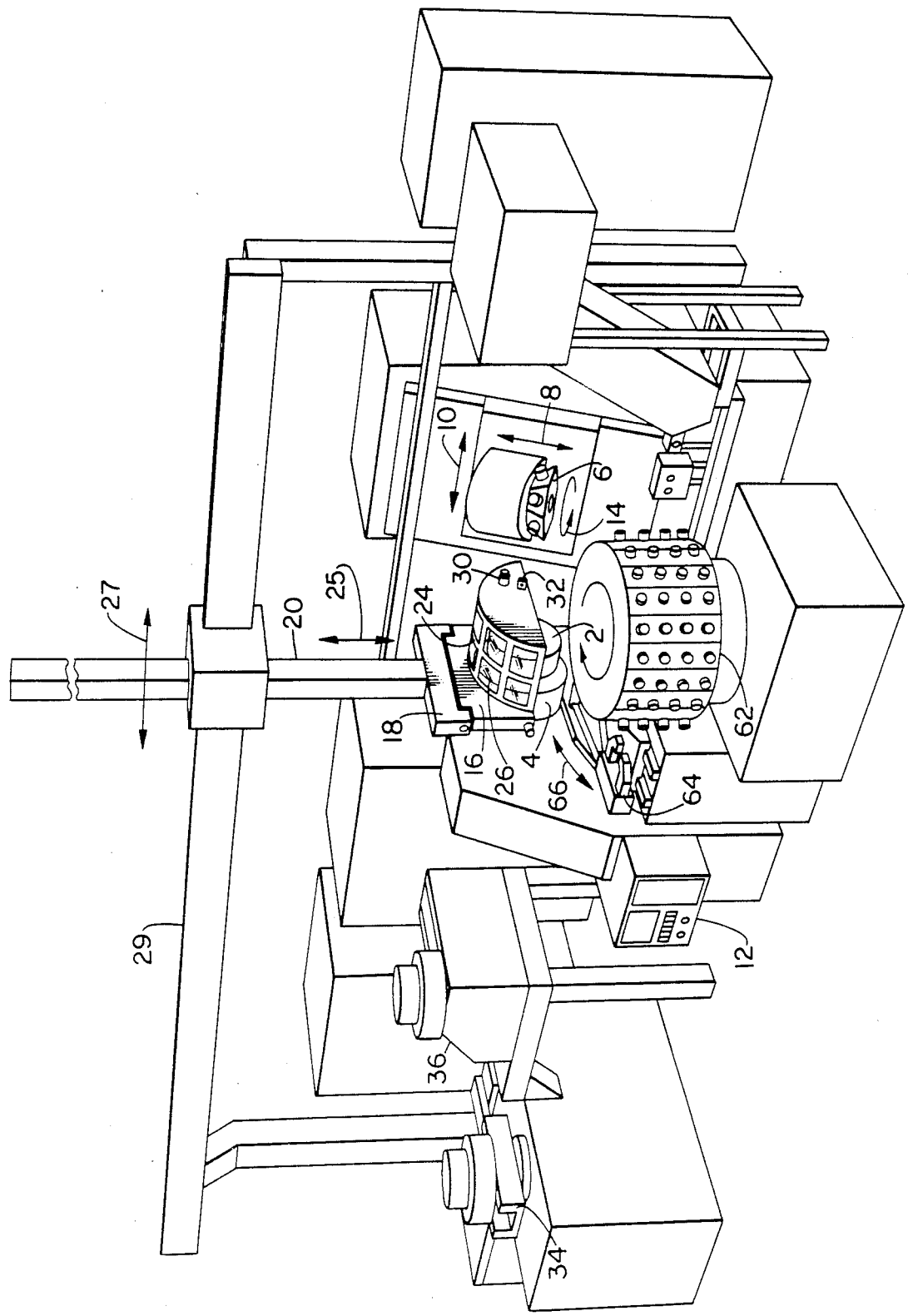
FIG. 1 is an overall perspective view of an exemplary machining apparatus using the invention of this application.

FIG. 1 shows an exemplary computer numerically controlled lathe incorporating this invention. The invention allows precise machining of workpieces such as jet engine parts to tolerances as low as 0.001 inches.

The lathe of FIG. 1 has a rotating spindle (not shown) on which is attached a workpiece 2 to be machined. The workpiece is attached to the spindle by means of a universal fixture 4.

A rotatable turret 6 containing a number of tools is moved in two dimensions along the x-axis 8 and the z-axis 10 to machine the workpiece. An x-axis electric motor and a z-axis electric motor (not shown) are connected to the turret in a known manner to move the turret in the x- and z-axes, respectively. The positions of the motors and the turret are controlled in accordance with a desired part program residing in a computer numerical controller 12. The motors are connected to the numerical controller in a positional closed loop feedback arrangement, each of the motors being connected to a position sensor, such as a resolver, which produces an electrical signal indicating the actual position of the motor to which it is connected. For each axis of motion, this actual position indicating signal is compared with a signal related to a desired position of the turret in that axis. A pair of error signals result from such comparisons which control the movement of the motors so as to reduce the errors to zero. This places the turret in the desired position in each axis relative to the workpiece so as to machine the workpiece in accordance with the part program.

The turret is connected to a hydraulic servomotor (not shown) which rotates the turret, as indicated by arrow 14. The hydraulic servomotor thus indexes the turret so that a desired tool is brought into position for machining the workpiece.

In some embodiments of the invention and in the embodiment shown in FIG. 1, the axis of rotation of the turret is not parallel to the x- or z-axes. This arrangement is known as a slanted turret. As described below, although the invention of this application is advantageous regardless of the orientation of the axis of rotation of the turret, it is particularly advantageous for a machining apparatus using a slanted turret.

The machining apparatus of FIG. 1 includes a workpiece loading mechanism having yoke 16 which rigidly holds the universal fixture containing a workpiece. The yoke is rotatably connected to a yoke holding member 18 which is fixed to the lower end of a vertical support member 20. The yoke is connected to a hydraulic actuator (not shown) which rotates the yoke, as indicated by arrow 22 in FIG. 2, to swing the yoke into a horizontal position for grasping a workpiece at workpiece holding stations outside the machining environment.

A cage-like supporting shroud 24 having a series of rectangular openings 26 is fixed to the yoke and partially encloses the workpiece and universal fixture. The shroud has an end surface 28 on which is fixed a tool probe 30 and a system accuracy check gauge 32. The shroud is constructed such that (a) the tool probe and system accuracy check gauge are rigidly attached to the spindle when the workpiece loading mechanism is locked to the spindle during a calibration operation and (b) the shroud is completely out of the anticipated workpiece envelope. In the exemplary embodiment shown in FIGS. 1 and 2, the shroud is a half cylinder with rectangular openings and is made of mild steel, for example. The end surface 28 is semi-circular and lies in a plane perpendicular to the z-axis. The axis of rotation of the spindle passes through the center of the circle defined in part by surface 28. Although the shroud has rectangular openings in the drawings, it just as well could be constructed without such openings.

The yoke of the workpiece loading mechanism is movable in a vertical direction as shown by arrow 25 to place a workpiece on the spindle and, as discussed in more detail below, the move the tool probe and system accuracy check gauge into position for performing a calibration operation. The yoke is also movable horizontally as indicated by arrow 27 when the yoke has been disconnected from the spindle and raised from the area where machining is to take place. The workpiece loading mechanism moves along rail 29 between workpiece holding stations 34 and 36 and the area where machining takes place in the vicinity of the spindle. The loading mechanism moves workpiece back and forth between the spindle and station 36 and between stations 36 and 34. Workpieces are placed at station 34 by transfer mechanisms operating between the machining apparatus of FIG. 1 and other machining apparatus and warehousing facilities forming a completely automated manufacturing facility. Those aspects of automated manufacturing are not discussed further here because they are not a part of this invention.

Figure 2:
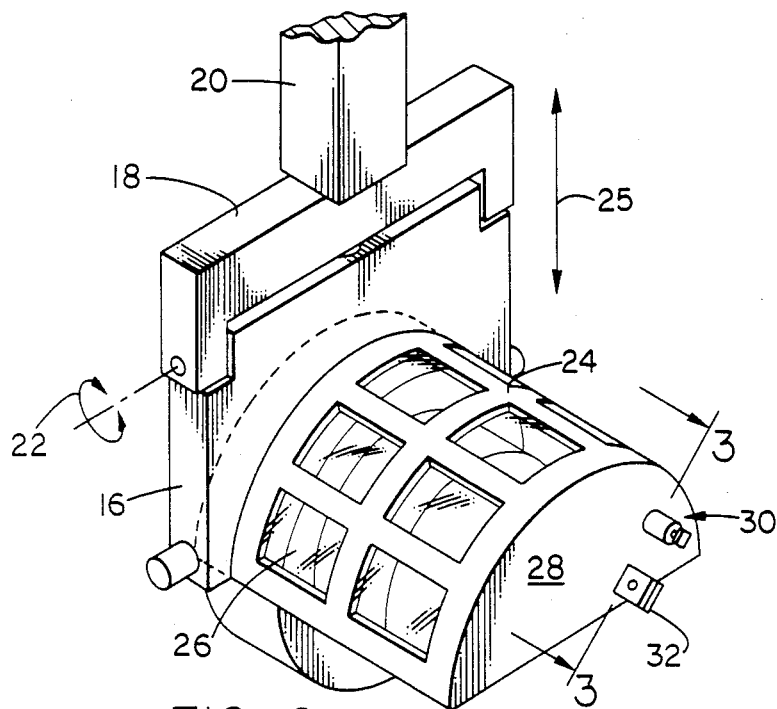
FIG. 2 is a more detailed perspective view of a portion of the workpiece loading mechanism of the machining apparatus of FIG. 1, which shows the calibration means of the invention.
Figure 3:
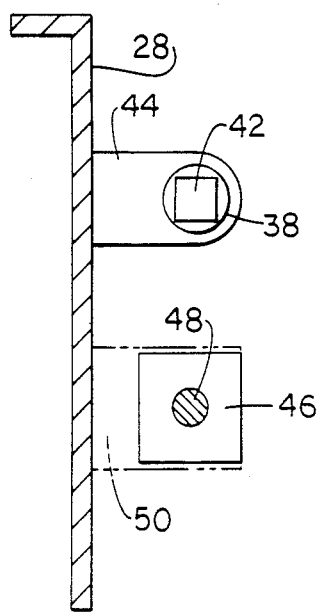
FIG. 3 is a sectional view taken along line 3—3 in FIG. 2.

As shown most clearly in FIG. 2, tool probe 30 and system accuracy check gauge 32 are fixed to end surface 28 on a line parallel to the x-axis of the machining apparatus. As shown in FIG. 3, probe 30 comprises a housing 38 containing a mechanism for generating an electrical signal when the probe is contacted. The probe alos contains an actuator rod 40, one end of which is connected inside the housing 38 to the mechanism for generating an electrical signal. The other end of the actuator rod is connected to a rectangular probe tip 42, which is contacted by a tool in the turret during a calibration operation. The probe tip is movable in three dimensions. The tool probe generates a signal whenever the probe tip is moved a predetermined amount in one or more of those three dimensions by motion of the tool against the probe tip. Preferably, the tool probe is oriented such that four of the edges of the rectangular probe tip are parallel to the x-axis and the remaining four edges are perpendicular to the x- and z-axes. The axis of the actuator rod is parallel to the z-axis in the embodiment of FIGS. 2 and 3.

If the workpiece loading mechanism were brought into a workpiece loading position on the machining apparatus and locked to the spindle, the cutting edges of the tools in the turret could be brought into contact with the tool probe under numerical control. When contact is made with the tool probe, a signal is sent from the tool probe to the computer numerical control which then uses the signals from the position sensors connected to the x- and z-axis motors to set appropriate position offsets in the part program. By this action, such things as tool wear and dimensional changes in the tool caused by temperature, stress and the like can be taken into account to improve precision in the machining operation.

The particulars of the machining apparatus and the workpiece loading mechanism beyond what is shown in the FIGS. and discussed in this written description are not a part of this invention. The invention of this application could just as easily be applied to other machining apparatus or workpiece loading mechanisms. By way of example, the invention of this application has been successfully applied to a Giddings and Lewis Model 532 Lathe run by a General Electric MC2000 Series Computer Numerical Controller. Workpieces are loaded into the lathe by a Gilman Workloader made by Giddings and Lewis, the workloader being run by a General Electric Series 6 Programmable Controller.

The details of the tool probe are well-known and are not a part of this invention. One example of such a probe is commercially available from Reinshaw Electrical, Ltd. of England.

Machining of jet engine parts requires tolerances to be maintained to about 0.001 inches. This requires that the parts of the machine tool flex less than about fifty millionths of an inch in response to forces created during a calibration operation. The available tool probes typically require more force to produce an output signal when contacted by a tool moving along the axis of the actuator rod than they do when contracted by a tool moving in a direction perpendicular to that axis. Also, the amount of movement along the actuator rod axis needed to produce a probe output differs from the amount of movement perpendicular to that axis needed to produce such a probe output. This is because the actuator rod pivots in an arc about a fixed point in the housing when it is moved by a force in a direction perpendicular to its axis and translates when it is moved by a force along its axis.

Figure 2A:
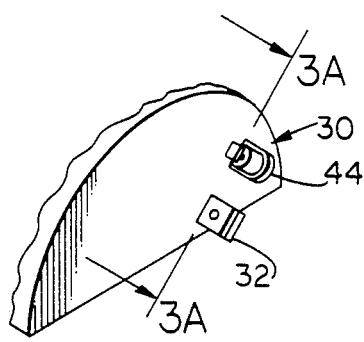
FIG. 2a shows a portion of the FIG. 2 structure showing an alternate mounting for the calibration means.
Figure 3A:
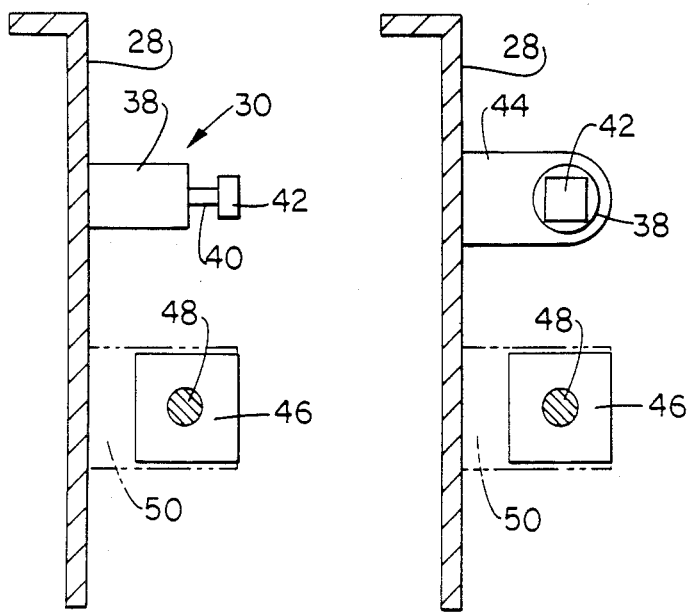

In order to more easily achieve the flexing requirements described above and to insure that like movements in the x- and z-axes trip the tool probe during a calibration operation, Applicant has developed the embodiment of FIGS. 2a and 3a. That embodiment differs from the embodiment of FIGS. 2 and 3 in that the tool probe has been rotated 90° with respect to its position in the FIG. 2–3 embodiment, about an axis parallel to the x-axis. This is accomplished by attaching the tool probe to a support member 44 fixed to surface 28 such that the actuator axis is parallel to surface 28. Movement and force of a tool against the probe tip 42 needed to produce a probe output thus will be equal in both the x- and z-axes. The accuracy of tool calibration thus is improved.

Both embodiments described above include a system accuracy check gauge 32 which comprises a rectangular member 46 of known dimensions fixed to a rod 48 extending parallel to surface 28 and perpendicular to the x-axis from a support member 50 fixed to surface 28. The rectangular member 46 is oriented such that four of its edges are parallel to the x-axis of the machining apparatus and the other four edges lie along the z-axis of the machining apparatus.

The system accuracy check gauge is a means by which the positional and dimensional accuracy of the machining system can be checked. This is accomplished by contacting a probe mounted in the turret against the surfaces of the rectangular member that are perpendicular to the x- and z-axes. The positions of the x- and z-axes motors are measured by the position sensors at those points of contact are then used to compute measured dimensions of the rectangular member. Those measured dimensions are next compared with the known dimensions and any differences between the measured and known dimensions are used to compute appropriate correction factors or probe offsets in the numerical controller to improve machining accuracy, as is known.

Figure 4:
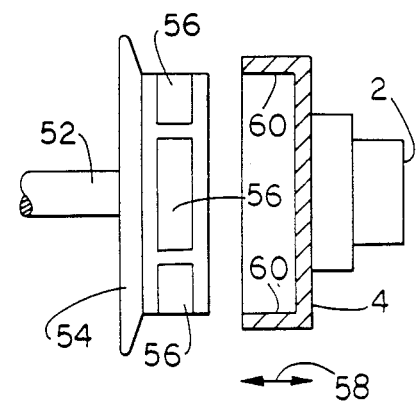
FIG. 4 is an exploded side view of a portion of the machining apparatus which illustrates the connection of a workpiece to the spindle of the machining apparatus.

FIG. 4 illustrates how a universal fixture 4 and attached workpiece 2 are locked to spindle 52. The end of the spindle has disk-shaped locking member 54 which contains a series of expandable shoes 56 around its periphery. The universal fixture and attached workpiece are placed on the locking member by the workpiece loading mechanism (not shown in FIG. 4), in a direction illustrated by arrow 58. The shoes 56 expand radially to frictionally engage inner surface 60 of the universal fixture to lock it into place. Such an arrangement is commercially available from Sheffer Collet Company of Traverse City, Mich.

The machining apparatus of FIG. 1 also includes a tool changing mechanism comprising a rotatable drum 62 containing a plurality of tools in openings around its periphery. The tool changing mechanism also includes a swing arm 64 rotatable along arc 66 which loads the turret with a selection of tools from the drum and replaces those tools back in the drum when no longer needed for machining. The tool changing mechanism can be, for example, a General Electric Carboloy Tool Changer.

An example of the operation of a machining apparatus having the invention of this application is as follows. A universal fixture with workpiece is delivered to station 34. The workpiece loading mechanism then grasps the universal fixture, for example, with the three locking pins, as is known in the art, and transfers the workpiece to station 36.

The machining apparatus next must be calibrated. Before a workpiece is placed on the spindle of the machining apparatus, the location with respect to the machining apparatus of a probe in the turret is first determined by touching it to reference surfaces on the spindle. Those reference surfaces are defined by a groove of rectangular cross section around the periphery of locking member 54. The groove is adjacent shoes 56 such that is completely covered by inner surface 60 of a universal fixture when the universal fixture is placed on the spindle. The bottom of the groove is parallel to the z-axis of the machine and forms one of the reference surfaces. The other reference surface is defined by one of the vertical walls of the groove, that wall being perpendicular to the bottom of the groove and to the z-axis of the machine.

The diameter of the locking member, as defined by the bottom of the groove, is known. The positional and dimensional accuracy of the machining apparatus can be checked by probing diametrically opposite points on the bottom of the groove. The computer numerical controller then computes correction factors or probe offsets similar to those computed in connection with the probing of the system accuracy check gauge.

Next, the workpiece loading mechanism places the workpiece from station 36 onto the spindle and shoes 56 lock the universal fixture and workpiece loading mechanism to the spindle. While the workpiece loading mechanism is locked to the workpiece and spindle, the location of the tool probe 30 with respect to the machine is ascertained by touching the turret mounted probe to surfaces on the tool probe tip that are perpendicular to the x- and z-axes.

The turret mounted probe and the tool probe produce electrical signals when they are touched. When the probe signals are produced, the computer numerical controller records the positions of the x- and z-axes motors, as indicated by the position sensors connected to those motors. Those recorded positions are used by the numerical controller to derive appropriate offsets for the part program defining the desired workpiece dimensions.

A tool calibration next is performed before the workpiece loading mechanism releases the universal fixture and while it remains in the machining environment. The turret is indexed to bring a tool to be calibrated into the position it occupies when it performs a machining operation. The cutting edge of the tool is then brought to the tool probe under computer numerical control. The cutting edge of the tool then is contacted to the sides of the rectangular probe tip to indicate to the computer numerical controller the location of the cutting edge with respect to the machining apparatus. This calibration operation can be repeated for all the tools in the turret 6 and rotatable drum 62.

Next, the turret mounted probe is brought to the system accuracy check gauge under computer numerical control and touched to opposite sides of the rectangular member 46 to establish correction factors or probe offsets described above.

The workpiece loading mechanism then disengages itself from the universal fixture and returns to a parked position outside the machining area. The workpiece loading mechanism may be returned to the machining area and locked to the spindle for a new tool calibration or system accuracy check any time the workpiece and universal fixture are on the spindle.

The workpiece then is rough cut under computer numerical control to within a predetermined deviation, for example, 0.010 inches, from the programmed workpiece dimension. Then the turret mounted probe is positioned under computer numerical control to contact the workpiece to indicate to the computer numerical controller the amount by which the actual dimensions of the workpiece differ from the programmed dimensions. This amount is compared with the predetermined deviation and any difference is used by the computer numerical controller as an offset which controls, in part, a fine cutting operation which is accomplished by the tool which completed the rough cut. This offset compensates for any tool wear or other dimensional changes which may have occurred in the rough cut operation.

Because the accuracy of the probe worsens with time, for example, due to structural changes in the probes and the machining apparatus caused by thermal and stress effects and the like, the calibration should be performed at regular intervals, even in the middle of a machining operation, if necessary, to insure a highly accurate machine workpiece. Of course, a tool calibration would also have to be performed if a tool were to break during a machining operation or otherwise were to need replacing. The invention of this application is easily able to perform these functions and to accomplish them in a completely automated fashion without the intervention of a human operator. Thus, the invention is a major step on the road to a completely automated manufacturing facility.

I claim:

1. A machining apparatus comprising:
   a workpiece holding means;
   a tool holding means containing one or more tools for machining a workpiece in the workpiece holding means;
   a means for providing relative motion in one or more axes between the tool holding means and the workpiece holding means;
   a means for loading a workpiece into the workpiece holding means, the loading means being movable between a first position remote from the workpiece holding means and a second position adjacent the workpiece holding means at which the loading means is able to load a workpiece into the workpiece holding means; and a means for calibrating the machining apparatus fixed to the loading means.

2. The apparatus of claim 1, wherein the means for calibrating comprises:
a probe means for ascertaining the location of one or more of the tools in the tool holding means.

3. The apparatus of claim 1, further comprising:
a means for rigidly fixing the loading means to the workpiece holding means when the loading means is in the second position.

4. The apparatus of claim 1, wherein the loading means comprises:
a yoke means for holding a workpiece; and
the workpiece holding means comprises:
a means for rigidly fixing the loading means to the workpiece holding means when the loading means is in the second position.

5. The apparatus of claim 4, wherein the means for calibrating comprises:
a member extending from the yoke means, able to at least partially enclose a workpiece held in the yoke means, and having a surface on which is mounted a probe means for ascertaining the location of one or more of the tools in the tool holding means.

6. The machining apparatus of claim 1, wherein the means providing relative motion comprises:
a computer numerical control means operating in accordance with a part program representing the desired machining of the workpiece.

7. The machining apparatus of claim 1, wherein the means for providing relative motion moves the tool holding means in two perpendicular axes with respect to the workpiece holding means; and
the means for calibrating comprises a probe which produces an electrical signal when it is moved a predetermined amount in response to a force produced by contact with one or more tools in the tool holding means.

8. The machining apparatus of claim 1, wherein the means for calibrating comprises:
a probe for ascertaining the location of the cutting edges of one or more machine tools with respect to the machining apparatus; and 9. The machining apparatus of claim 7, wherein said probe is equally responsive to forces acting in the direction of either of said perpendicular axes.

10. The machining apparatus of claim 7, wherein said probe includes:
an actuator rod;
a probe tip connected to one end of said actuator rod; and
means connected to the opposite end of said actuator rod for producing said electrical signal when said probe tip is moved a predetermined amount in response to a force produced by contact with one or more tools in said tool holding means.

11. The machining apparatus of claim 10, wherein said probe is oriented such that the axis of said actuator rod is perpendicular to both of said perpendicular axes.

* * * * *